(No Model.) 2 Sheets—Sheet 1.

J. H. PENDLETON.
SPEED GEARING.

No. 520,801. Patented June 5, 1894.

Witnesses
Chas. H. Smith
J. Staib

Inventor
John H. Pendleton
per Lemuel W. Serrell
Atty (No Model.) 2 Sheets—Sheet 2.

J. H. PENDLETON.
SPEED GEARING.

No. 520,801. Patented June 5, 1894.

Witnesses
Chas. H. Smith
J. Staib

Inventor
John H. Pendleton
per Lemuel W. Serrell
Atty

UNITED STATES PATENT OFFICE.

JOHN H. PENDLETON, OF BROOKLYN, ASSIGNOR TO R. DUNCAN HARRIS, OF NEW YORK, N. Y.

SPEED-GEARING.

SPECIFICATION forming part of Letters Patent No. 520,801, dated June 5, 1894.

Application filed June 15, 1893. Serial No. 477,677. (No model.)

*To all whom it may concern:*

Be it known that I, JOHN H. PENDLETON, a citizen of the United States, residing at Brooklyn, in the county of Kings and State of New York, have invented an Improvement in Speed-Gearing for Centrifugal Cream-Separators and other Machinery, of which the following is a specification.

In centrifugal separators, especially those intended for use in separating cream from milk or in making butter, difficulty has heretofore been experienced in obtaining the necessary speed especially when driven by hand power. In machines of this character the journals that are in contact with the bearings are liable to wear or cut with rapidity in cases where the speed of one surface upon another is very great, and in instances where the revolving device, having a speed of seven or eight thousand revolutions per minute, is supported by bearings that are stationary, the one is very liable to cut by contact with the other.

The object of the present invention is to lessen the relative speed of the contacting surfaces, and in effecting this object I employ revolving bearings so that the device having the highest speed is supported by a device that is rotating in the same direction but has a slower speed, thereby decreasing the friction of one surface upon another and lessening the tendency of one surface to cut into the other, and the tendency to wear and cut may be still further reduced by a second bearing that supports the intermediate bearing and is itself supported by a stationary bearing. In this manner the apparatus is rendered more durable, the power required to rotate the centrifugal apparatus is materially lessened, and a very rapid speed can be attained even by ordinary hand power.

Figure 1:
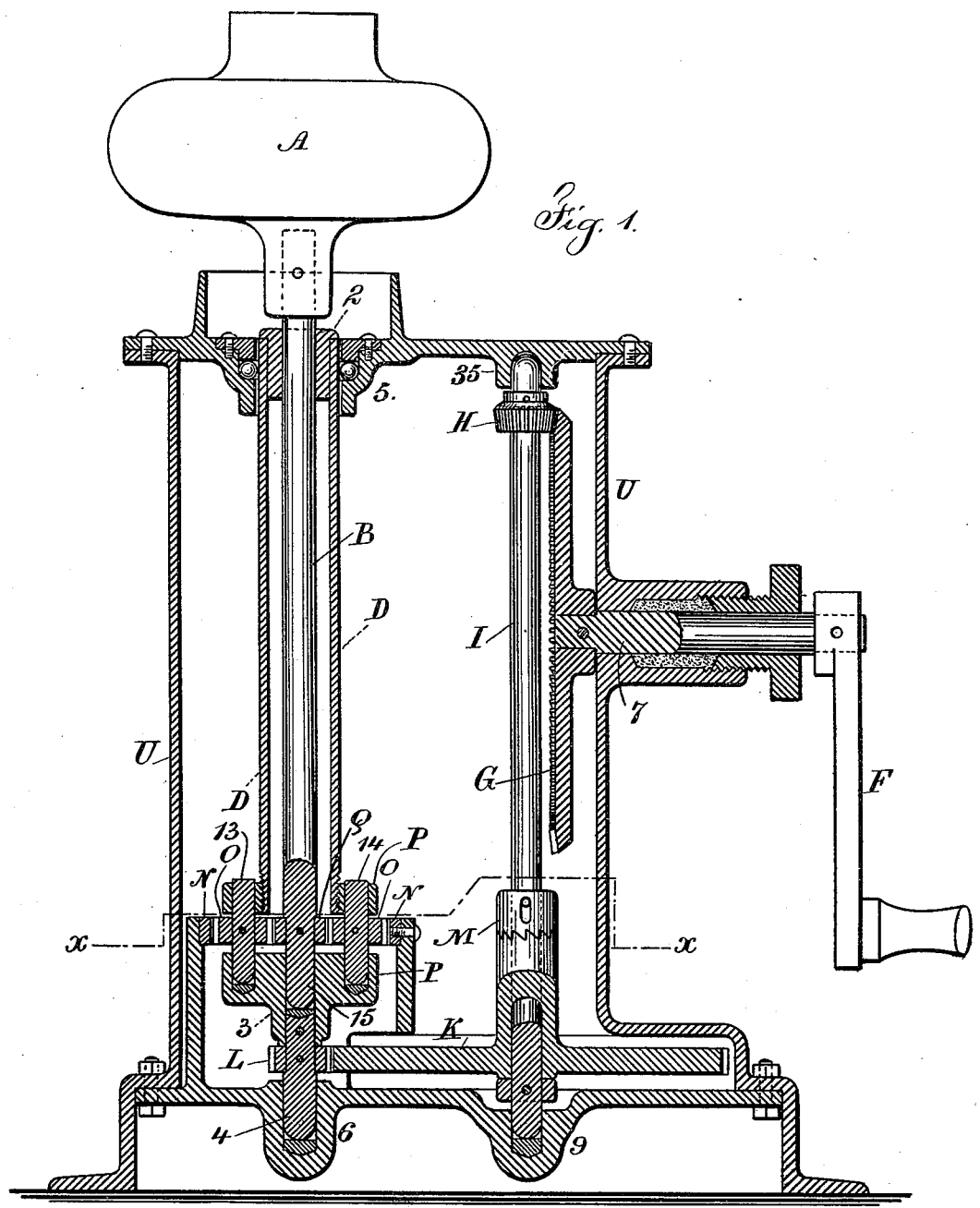
Figure 3:
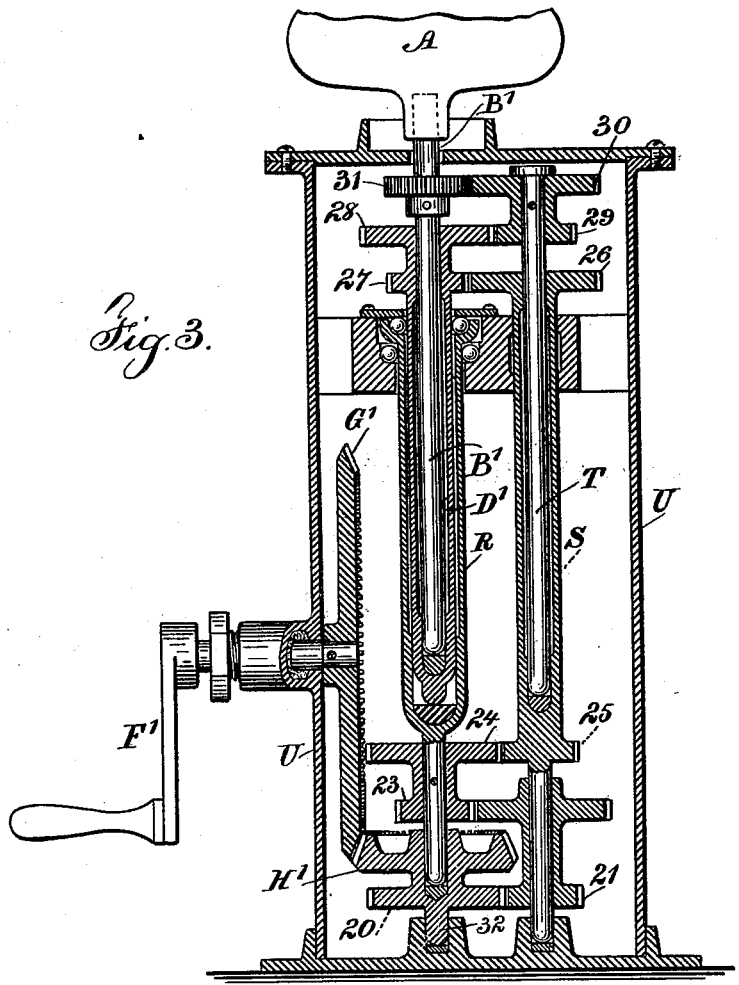
Figure 2:
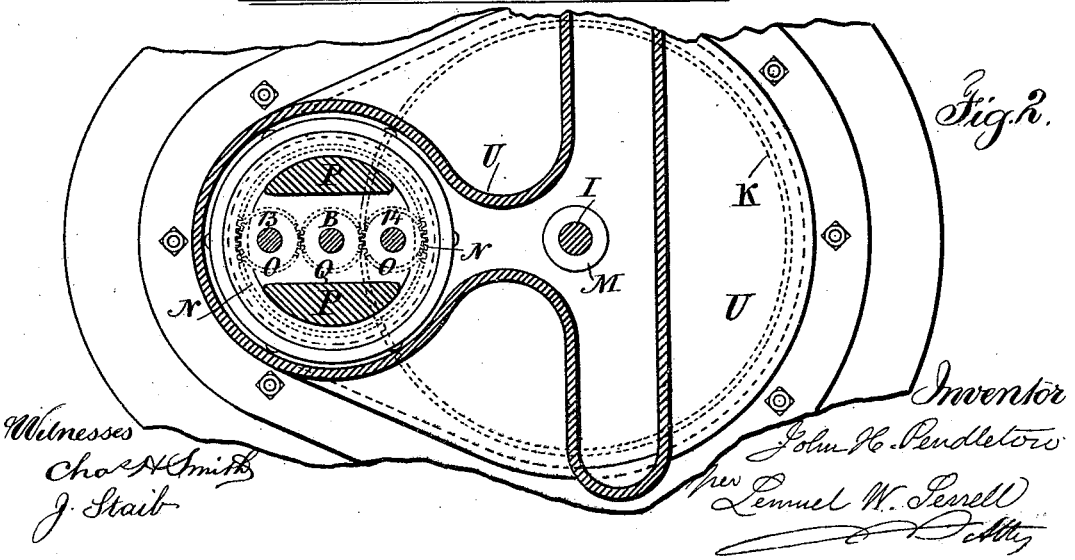

In the drawings, Figure 1 is a general vertical section illustrating the apparatus. Fig. 2 is a sectional plan at the line *x x*. Fig. 3 is a vertical section illustrating a modification of the device.

Let A represent the centrifugal cream or butter separating apparatus or other centrifugal device that is to receive a rapid rotation, and B is the shaft or axis of the same, and the support or bearing 2 around the axis is connected to the support or bearing 3 at the lower end of the axis by a tube D, and this tube D is rotated in the same direction but at a slower speed than the axis B, and the tube D and bearing 3 are supported at the lower end by a pivot 4 and by a stationary bearing 5 near the upper end which may be provided with balls if desired, as shown. These parts are to be of any desired size, shape or construction, so long as the tube B and bearing 3 rotate in the same direction as the axis B but at a slower speed, and in Figs. 1 and 2, I have represented the bearing 6 for the pivot 4 and the bearing 5 as stationary. These parts might be rotated in the same direction as the tube D but at a slower speed, such parts being suitably connected as hereinafter illustrated in connection with Fig. 3, but usually it is unnecessary to have three bodies rotating in the same direction between the axis of greatest speed and the external stationary bearing; and it will be apparent that the number of rotating bearings may be more or less.

In Fig. 1, I have represented a crank F having a shaft 7 and a bevel wheel G gearing with the pinion H on the vertical shaft I, which shaft is set at the base in a bearing or socket 9, and there is a gear wheel K gearing into a pinion L upon the pivot or arbor 4 so as to give to this pivot 4 a rapid rotation, but the speed should be midway between the highest speed of the axis B and separator A and the speed of rotation of the shaft I; and it is advantageous to employ a sliding clutch or coupling M between the shaft I and the hub of the gear wheel K, and the teeth of this clutch or coupling should be inclined so that the clutch or coupling will become self-acting to allow the continuous rotation of the bowl or other device A, even after the crank F may be stopped or held stationary. These devices and the gearing may be of any desired character; I have however represented a sun and planet gearing for communicating motion from the pinion L to the arbor B, and in this gearing N represents a stationary internal gear with which the pinions O O engage, such pinions being upon arbors 13, 14 that are carried by a socket plate P in the center of which is a recess or socket for the reception of the lower end 15 of the arbor B, and there is a pinion Q upon this arbor B which engages the pinions O O, hence as the socket plate P and pinion L are rotated together and the pinions O O are carried around bodily, said pinions O O will give motion to the axis B in the same direction as the rotation of the socket plate and with an augmented speed that is proportioned by the relative sizes of the stationary internal gear N and the pinion Q. It will be thus observed that the arbor I rotates in the bearings 3, 5 and 9 at a comparatively slow speed, and that the arbor or pivot 4 rotates in the stationary bearing 6 at a much higher speed, and that the lower end of the main arbor B rotates in the socket plate P at the maximum speed, but the friction of the end 15 of said arbor B and of the arbor itself in the bearing 2 is very materially lessened in consequence of the socket plate P and bearing 2 rotating with great rapidity and in the same direction as the arbor B, thus in centrifugal apparatus the parts are set spinning in the same direction and the external rotating bearing lessens the friction of the internal rotating bearing which is moving at a maximum speed but in the same direction.

The device represented in Fig. 3 is constructed upon the same principle as that represented in Figs. 1 and 2, but the axis B' to which the maximum speed is given is within a tubular bearing D' which is rotated in the same direction and this is within an outer bearing R which is rotated in the same direction but at a still slower speed, and the gearing for connecting and rotating these parts may be of any desired character; I have however represented the crank F' as giving motion to the gear wheel G' and pinion H' and to a gear wheel 20 gearing to a pinion 21, which in turn is connected with a gear wheel that drives a pinion 23 upon the axis of the tubular bearing R, and the weeel 24 gives motion to a pinion 25 on a tubular bearing S within which is an arbor T, and the wheel 26 at the upper end of the tubular bearing S gives motion to the wheel 27 upon the tubular bearing D', and the wheel 28 gives motion to pinion 29 upon the arbor T, and the wheel 30 gives motion to the pinion 31 upon the arbor B', so that by this arrangement the arbor B' to which the maximum speed is given is carried by two tubular and rotating bearings, and the arbor T is also carried by a tubular and rotating bearing S, the respective tubular bearings revolving in the same direction as the respective arbors but at slower speeds, so as to diminish the speeds of the contacting surfaces from the maximum speed of the arbor B' to the minimum speed of the pivot 32 of the wheel 20, which pivot 32 is in a stationary bearing.

The details of the respective bearings may be varied according to circumstances. I have represented in Fig. 3, small plates or steps for the lower ends of the respective arbors, which plates or steps are received in sockets and are preferably of hardened steel and upon them the convex or pointed lower ends of the respective arbors rest and rotate.

If desired the apparatus may be inclosed within a case U of any suitable size and shape, which case may support the shaft of the crank F, and the case may be sufficiently tight to hold oil or other lubricating material so that the respective parts are lubricated and substantially immersed in the oil within the case.

I do not confine myself to any particular character of centrifugal vessel, although I have shown at A a bowl adapted to the separation of cream from milk.

I claim as my invention—

1. The combination, with an arbor receiving the maximum speed, of a rotating bearing upon which the arbor is sustained, and a stationary bearing for the rotating bearing and gearing connecting the rotating bearing and the arbor together so that such bearing and arbor rotate in the same direction, the bearing rotating at a slower speed than the arbor, substantially as set forth.

2. The combination with the shaft or arbor B, of a pinion Q, the bearing 2, for the upper part of the arbor, and the socket plate P, forming a rotating bearing for the lower end of the arbor, a pivot for the socket plate and means for rotating the same, and gearing connecting the socket plate and arbor, substantially as set forth.

3. The combination with the shaft or arbor B, of the bearing 2, for the upper part of the arbor, and the socket plate P, forming a rotating bearing for the lower end of the arbor, a pivot for the socket plate, means for rotating the same, a stationary internal gear N, pinions O, O, and their arbors supported and carried by the socket plate, and the pinion Q, upon the arbor B, substantially as set forth.

4. The combination with an arbor, of rotating upper and lower bearings for such arbor, connections between such bearings and a pivotal support for the rotating bearings in line with the arbor, gearing for connecting the rotating bearings and the arbor, a crank and gearing for applying hand power for the rotation of the bearings of the arbor, substantially as set forth.

5. The combination with an arbor, of rotating upper and lower bearings for such arbor, connections between such bearings and a pivotal support for the rotating bearings in line with the arbor, gearing for connecting the rotating bearings and the arbor, a crank and gearing for applying hand power for the rotation of the bearings of the arbor, an automatic clutch between the gearing driven by the crank handle and the gearing that rotates the bearings of the arbor, substantially as set forth.

Signed by me this 9th day of June, 1893.

JOHN H. PENDLETON.

Witnesses:
GEO. T. PINCKNEY,
A. M. OLIVER.